United States Patent
Levenstein et al.

(10) Patent No.: US 10,059,484 B2
(45) Date of Patent: Aug. 28, 2018

(54) REFILLABLE CONTAINER FOR USE WITH VENDING MACHINES

(71) Applicant: C.H.& I. Technologies, Inc., Santa Paula, CA (US)

(72) Inventors: Lawrence M. Levenstein, Los Angeles, CA (US); Eric A. Williams, Ojai, CA (US)

(73) Assignee: C.H.& I. TECHNOLOGIES, INC., Santa Paula, CA (US)

( * ) Notice: Subject to any disclaimer, the term of this patent is extended or adjusted under 35 U.S.C. 154(b) by 0 days.

(21) Appl. No.: 15/684,295

(22) Filed: Aug. 23, 2017

(65) Prior Publication Data

US 2018/0057201 A1    Mar. 1, 2018

Related U.S. Application Data

(60) Provisional application No. 62/381,701, filed on Aug. 31, 2016.

(51) Int. Cl.

| | |
|---|---|
| *B65D 1/06* | (2006.01) |
| *B65D 23/00* | (2006.01) |
| *B65D 23/10* | (2006.01) |
| *B65D 23/14* | (2006.01) |
| *B65D 47/32* | (2006.01) |
| *G05B 19/12* | (2006.01) |
| *G06K 19/06* | (2006.01) |

(Continued)

(52) U.S. Cl.
CPC ............... *B65D 1/06* (2013.01); *A45D 34/00* (2013.01); *B65D 23/001* (2013.01); *B65D 23/10* (2013.01); *B65D 23/14* (2013.01); *B65D 47/32* (2013.01); *G05B 19/12* (2013.01); *G06K 19/06028* (2013.01); *G06K 19/0723* (2013.01); *G06Q 30/0185* (2013.01); *G07F 7/0609* (2013.01); *G07F 13/065* (2013.01); *F16K 15/025* (2013.01); *F16K 15/14* (2013.01)

(58) Field of Classification Search
CPC ........ B65D 1/06; B65D 23/10; B65D 23/001; B65D 47/2018; B65D 47/2025; B65D 47/32; B65D 23/00; B65D 47/20; G07F 7/06; G07F 7/0609; G07F 13/065; F16K 15/14; F16K 15/025; B67D 3/04
USPC ............... 222/185.1, 468, 479, 482; 141/113
See application file for complete search history.

(56) References Cited

U.S. PATENT DOCUMENTS

| | | | | |
|---|---|---|---|---|
| 523,951 A | * | 7/1894 | Fleet | ............... B65D 83/205 |
| | | | | 222/39 |
| 2,131,329 A | * | 9/1938 | Moore | ............... C02F 1/686 |
| | | | | 137/209 |

(Continued)

*Primary Examiner* — J. Casimer Jacyna
(74) *Attorney, Agent, or Firm* — Fulwider Patton LLP

(57) ABSTRACT

A refill bottle, such as a laundry refill bottle, is disclosed that can be used with a consumer refill station to reuse the bottle over and over. The refill bottle includes automatic flow control valves, that allow the bottle to be filled, handled, dispensed from, and refilled innumerable times without a cap. The elimination of a cap alleviates the manufacturer and consumer of the tasks of installing, loosening, tightening, removing, and reinstalling or replacing the cap. The refillable bottle uses flow control valves, specifically an automatic filling valve, an automatic pressure vent valve, a manual/automatic dispensing valve, and an automatic vacuum vent valve. The refill bottle enables liquid and air to be exchanged during filling, handling, dispensing, and refilling.

12 Claims, 2 Drawing Sheets

(51) Int. Cl.
*G06K 19/07* (2006.01)
*G06Q 30/00* (2012.01)
*G07F 7/06* (2006.01)
*G07F 13/06* (2006.01)
*A45D 34/00* (2006.01)
*F16K 15/02* (2006.01)
*F16K 15/14* (2006.01)

(56) References Cited

U.S. PATENT DOCUMENTS

| | | | | |
|---|---|---|---|---|
| 2,400,955 A * | 5/1946 | Samel | ............ | B67D 1/04 137/223 |
| 3,595,445 A * | 7/1971 | Buford | ............ | B65D 47/2025 222/213 |
| 4,660,733 A * | 4/1987 | Snyder | ............ | B65D 88/08 220/634 |
| 4,746,034 A * | 5/1988 | Ata | ............ | B65D 21/0215 141/364 |
| 4,811,870 A * | 3/1989 | Bianco | ............ | B65D 25/2894 222/461 |
| 5,636,767 A * | 6/1997 | Vogrin | ............ | B65D 1/06 222/185.1 |
| 6,631,744 B1 * | 10/2003 | Gerhart | ............ | B65D 1/18 141/22 |
| 8,833,617 B1 * | 9/2014 | Compton | ............ | B65D 47/065 222/153.14 |
| 2005/0000984 A1 * | 1/2005 | Tan | ............ | B67D 1/0009 222/67 |
| 2005/0284889 A1 * | 12/2005 | DuBois | ............ | A47K 1/02 222/192 |
| 2006/0261156 A1 * | 11/2006 | Brown | ............ | B67D 7/02 235/381 |
| 2007/0246488 A1 * | 10/2007 | Cash | ............ | B65D 1/20 222/466 |
| 2007/0267445 A1 * | 11/2007 | Fogelberg | ............ | B67D 1/00 222/185.1 |
| 2008/0264980 A1 * | 10/2008 | L'Ecuyer | ............ | B65D 1/06 222/510 |
| 2008/0302711 A1 * | 12/2008 | Windmiller | ............ | B65D 1/06 210/137 |

* cited by examiner

REFILLABLE CONTAINER FOR USE WITH VENDING MACHINES

CROSS-REFERENCES TO RELATED APPLICATIONS

This application claims priority from U.S. Provisional Patent Application No. 62/381,701, filed Aug. 31, 2016, the contents of which are fully incorporated herein by reference.

BACKGROUND

The world has experienced a movement toward more environmentally friendly product packaging, which has gained momentum recently as the world begins to appreciate the ever-growing presence of non-biodegradable waste in the landfills and areas of waste disposal. Companies have tried to explore new options for controlling the amount of waste and costs associated with containers of products purchased every day. Packaging of products, including foods, beverages, personal care products, household cleaning products, and the like are a prime candidate for further action to protect the environment.

Personal care products, such as lotions, creams, hair care products, cosmetics, and the like have been slow to move toward a more environmentally friendly packaging. This may be because the industry is, to a large extent, packaging-driven, with the commercial success of many products a direct result of the public's affection for the packaging that accompanies the product rather than the quality of the product itself. Companies that sell colognes, perfumes, eye make-up, cosmetic creams, etc. may spend much more capital on the response of potential customers to their packaging than their products. As a result, cosmetics and personal care products companies have resisted the movement to more environmentally friendly packaging, leading to significant waste and a higher cost to both the manufacturer and the customer for repeated purchasing of the same packaging. The trend, however, is for both companies and consumers to give credence to the need to conserve resources and reduce waste, and look for new and better ways to preserve both the environment and save money in the process.

One such way in which waste can be reduced is by reusable packaging, The present invention relates generally but not exclusively to the field of materials management, and more particularly to a refillable container that can be used in connection with refilling stations, kiosks, vending machines, and the like.

A hand-held refillable material transfer system may be configured to move highly viscous materials from a remote point of manufacture to a point of sale. The material transfer system may be configured to dispense only the required amount of material without waste, which is especially important when fluids or materials are not easily handled and cannot be transmitted easily or safely from container to container without unwanted exposure. Preferably, such a material transfer system reduces or eliminates costs and expenses attendant to using traditional disposable personal packaging as well as the waste of material associated with most existing systems. A refillable material transfer system may further be configured to use low cost components, such as a non-pulsating solution for dispensing and transferring thick fluids and other such materials.

Refillable and reusable packaging for consumer goods will continue to emerge and become more prominent as the need to reduce packaging waste becomes a moral and economical imperative. Reducing packaging waste is a goal of businesses and governments alike, from municipalities that face the growing problem of landfills and waste management, to companies who need to remain competitive as competitors turn to refillable packaging. This issue will only continue to grow and move to the forefront of the public's consciousness as the problems associated with consumer packaging waste exacerbates.

One solution to the problem of consumer packaging waste is disclosed in United States Patent Publication No. 2011/0225106, where a refillable consumer packaging station can be used to refill consumer products in a specially designed refillable container. An example of a type of refillable container is disclosed in United States Patent Publication No. 2014/0209640. The contents of these references are fully incorporated by reference herein. A personal refillable container is brought to the station by the consumer after it is depleted, and the refill station can refill and recharge the container so that it can dispense the new product without the need for new packaging. The shared savings to the manufacturer and the consumers for this reduction in waste can be in the millions of dollars.

The benefits of such a refill station are multi-fold, as discussed in the incorporated patent applications. In addition to the elimination of waste, the refill stations can provide a wide variety of products that can be customized to the customer's preferences without stocking inventory for every conceivable variation. For example, the refill station may offer a laundry detergent product for refilling the personal container. In addition to the base detergent, scents can be incorporated into the detergent at the refill station, as well as options such as fabric softeners, additives, or other modifiers. The customer can personalize the detergent product to his or her preferences, and create a detergent that is specifically designed for that consumer. The detergent provider can sell more product while reducing inventory, and the reusable container ensures that no waste is created once the detergent is depleted. The consumer simply returns to the refill station, where it is preferably located in a mall, shopping center, or other convenient location, and the consumer's personal preferences are always available to refill the packaging.

SUMMARY OF THE INVENTION

The invention is a refill bottle, such as a laundry refill bottle, that can be used with a consumer refill station to reuse the bottle over and over. The refill bottle includes automatic flow control valves, that allow the bottle to be filled, handled, dispensed from, and refilled innumerable times without a cap. The elimination of a cap alleviates the manufacturer and the consumer of the tasks of installing, loosening, tightening, removing, and reinstalling or replacing the cap, and obviates certain issues relating to leakage, misplacement, etc. associated with a cap.

The refillable bottle achieves the objectives of the invention through the flow control valves, specifically an automatic filling valve, an automatic pressure vent valve, a manual/automatic dispensing valve, and an automatic vacuum vent valve. The refill bottle enables liquid and air to be exchanged during filling, handling, dispensing, and refilling.

The automatic filling valve enables liquid to be transferred from the dispensing port on the refill station through it and into the refill bottle during filling and refilling. This valve is operated and opened by the net forces between its inlet and its outlet. This valve is operated and closed by the net forces between its outlet and its inlet. These net forces are based on the forces applied from the net differential pressure between the valve inlet and the valve outlet on the cross-sectional material (fluid) area of a translatable seating element in the valve, and the forces applied from another valve element capable of storing energy. This valve does not require human or other intervention to be operated, opened, closed.

The automatic pressure vent valve enables air to be transferred through it and vented out of the refill bottle as it is displaced by the entering material (liquid) during the filling and refilling. This valve is operated and opened by the net forces between its inlet and its outlet. This valve is operated and closed by the net forces between its outlet and its inlet. These net forces are based on the forces applied from the net differential pressure between the valve inlet and the valve outlet on the cross-sectional material (fluid) area of a translatable seating element in the valve, and the forces applied from another valve element capable of storing energy. This valve does not require human or other intervention to be operated, opened, closed.

The manual/automatic dispensing valve enables liquid to be transmitted through it and dispensed out of the refill bottle during dispensing, and automatically closes when the dispensing operation is concluded. This valve does require human or other intervention to be operated and opened. This valve does not require human or other intervention to be operated and closed.

The automatic vacuum vent valve enables air to be transferred through it and vented into the refill bottle, with this volume of air replacing the volume of the liquid dispensed out of the bottle during dispensing, thereby breaking the vacuum that would otherwise be developed in the bottle. This valve is operated and opened by the net forces between its inlet and its outlet. This valve is operated and closed by the net forces between its outlet and its inlet. These net forces are based on the forces applied from the net differential pressure between the valve inlet and the valve outlet on the cross-sectional material (fluid) area of a translatable seating element in the valve, and the forces applied from another valve element capable of storing energy. This valve does not require human or other intervention to be operated, opened, closed.

The present invention provides an automatic transfer of laundry detergent into the refill bottle using valves that do not require human or other invention. These valves can be relatively simple, inexpensive, reliable, repeatable, durable, and particularly valuable for a bottle to be refilled innumerable times, with ease and without certain issues.

As a comparison, a typical existing atmospheric laundry bottle has a cap, which requires human or other intervention to be installed after filling with liquid and properly tightened, loosened before dispensing liquid (to enable air to vent into the bottle), re-tightened and re-loosened before and after any subsequent handling, removed before refilling with liquid (to allow liquid into the bottle and air to vent out of the bottle), reinstalled or replaced after refilling, etc.

For a bottle to function as a refill bottle and be considered valuable as a refill bottle, it should be capable of being refilled a number of times, with ease and without significant issues. For a refill bottle with a cap, the multiple human or other interventions required to install, loosen, tighten, remove, and reinstall or replace the cap are vulnerable to certain issues. These issues include a human or other error with the cap; a lost cap causing the bottle to no longer be suitable of being handled and refilled; wear and tear on the cap causing the liquid to leak or spill during handling; the cap not being loosened before dispensing, causing erratic flow of the liquid during dispensing; the cap not being tightened before handling, causing the liquid leak or spill during handling. The vulnerability of a bottle with a cap to the above and other issues is a barrier to a bottle with a cap functioning as a refill bottle and being considered valuable as a refill bottle. This invention eliminates the cap on the bottle and the issues associated with a cap on a bottle.

This invention provides the automatic means for an atmospheric laundry bottle to be filled, handled, dispensed from, and refilled innumerable times, with ease and without significant issues.

DETAILED DESCRIPTION OF THE PREFERRED EMBODIMENTS

Figure 1:
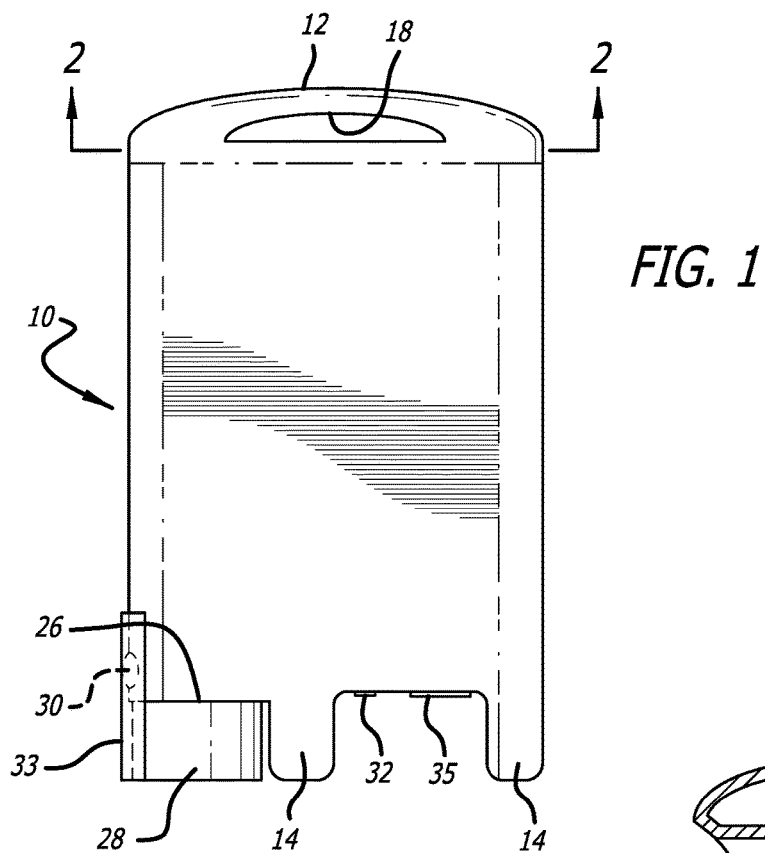
FIG. 1 is an elevated, perspective view of a first embodiment of the present invention in the form of a refillable laundry detergent bottle.

Common atmospheric laundry bottles range from about 64 fluid ounces (½ gallon) to 128 fluid ounces (one gallon), and are made from a relatively light-weight blow-molded plastic such as HDPE (High-Density PolyEthylene) that is suitable for ambient temperatures. Bottle 10 represents a refillable container that may be used with a refillable consumer product, such as, for example, laundry detergent. The uses for the bottle extend beyond the specified usage, and can be used with most heavy or viscous liquids, such as oils, soaps, shampoos, and the like.

The bottle 10 may be molded with a handle 12 on an upper surface for convenient carrying, and preferably include one or two pair(s) of legs 14 for stabilizing the bottle. On the upper surface 18 of the bottle 10, such as below the handle 12, are a pair of one-way valves or vents arranged to allow air to enter and escape, respectively, during dispensing and filling. That is, one valve is designated as a relief valve used during filling so that air can escape while product is entering the bottle 10, and another valve is active during dispensing to allow air to enter as product is dispensed from the bottle.

The bottle 10 may be formed with a removable cup 28 that is attached to the lower surface of the bottle as through a détente, threaded fitting, tab and slot arrangement, or some other releasable connection for attaching the cup to the bottle. The bottle 10 may also be equipped with a button 30 that is used to dispense the fluid therein as set forth below. The dispensing button 30 will preferably be located on a front surface near a ledge 26 under which the cup 28 attaches, although other locations for the button are also available. As part of an anti-tampering measure, a decal 33 may be placed over the button 30 and extending to the cup 28 to indicate that the bottle has not previously been used. The decal 33 preferably includes a bar code or other machine reading indicia that describes the content of the bottle 10, including any additives, scents, etc. The bar code may also include customer information, payment information, or other data or information to facilitate the transaction. The decal 33 may further include perforations that allow the decal 33 to be torn when the bottle 10 is used after the refill operation. In this manner, the status of the bottle as used can be discerned while the information included in the bar code can still be read by the refill station to facilitate the transaction and refill operation.

Preferably attached to the underside of the bottle 10 is a read/write RFID tag transponder 35 that is associated with, and remains physically coupled to, the bottle 10. The RFID tag 35 is capable of wireless two way data communication with a refilling station or other data exchange.

The RFID transponder 35 allows the bottle to record and retain the unique serial number of the bottle during its life cycle, from its manufacturing date through its use, to its eventual disposal. The Read/Write RFID tag (transponder) 35 associated with the bottle includes passive NFC (Near Field Communication tag) based on ISO/IEC 14443A Type 1 or Type 2 tag. A passive tag receives power from the RF transmission received, and does not require a physically connected power source (i.e., a battery).

The ability to record data enables a bottle to be identified and traced in the event of a recall, and further allows the bottle to be accessed via the serial number through a number of different refill stations or data systems. The RFID tag also permits the recording and storage of a unique product "recipe" for the customer who wants to tailor the product to a particular specification. Using a variety of additives such as fragrances, softeners, dyes, etc., the customer can customize the product and the RFID tag can record and store the unique product combination. The refilling station will recall this information from the RFID tag and refill the refill bottle to the customer's specifications automatically without the customer needing to enter further information.

The invention also allows the recording of unique lot (batch) numbers for products to be stored, which allows subsequent identification in case of recall. The ability to identify which refill bottles include which recalled product, and thus limit a recall to only those refill bottles, is a significant benefit not heretofore seen in the prior art. With multiple ingredients and repeated reuses of the refillable bottle, tracking would be virtually impossible and lead to recalls of perfectly good product. The RFID tags can include data such as lot numbers, date of refill, and other critical information that would be important in a recall situation, and be retrieved wirelessly from a suitable device without physically being present at a refill station. The RFID can rewrite the information over the previous information with each refill, and thus maintain a current listing of the contents of the bottle, or the RFID could maintain a history of each refill depending upon the storage limits of the RFID tag and the needs of the user. This facilitates recall operations that are targeted only to those bottles that presently or immediately previously included recalled product, simplifying the process and reducing the costs of such recall operations significantly.

Figure 2:
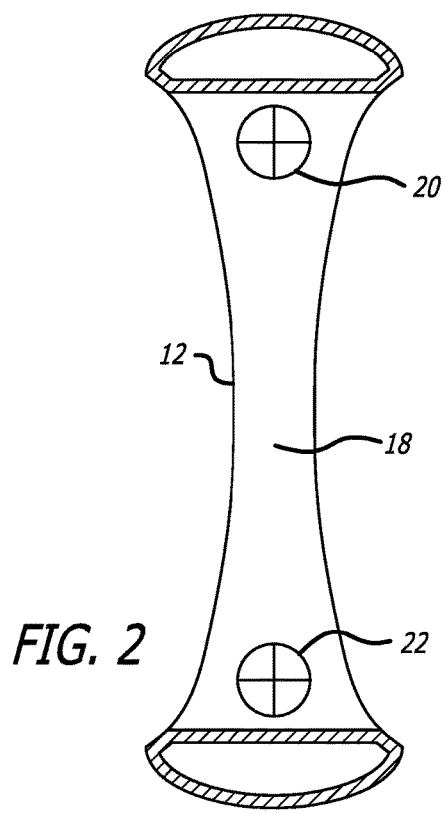
FIG. 2 is a cut-away view of the top of the embodiment of FIG. 1 underneath the handle.

FIG. 2 is a cut away view of the bottle 10 taken along lines 2-2 under the handle 12 that illustrates an air inlet check valve 20 and an air outlet check valve 22. When liquid is introduced into the bottle by the refill station, the air in the bottle is forced through the air outlet check valve 22 until all (or most all) of the air is displaced by the incoming fluid. In a first example, the diameter of the check valve 22 is an eighth inch and opens at a pressure of 2-4 PSIG. Once the bottle is brought home and the liquid is dispensed, air is drawn into the bottle 10 through the air inlet check valve 20 to prevent a negative pressure or vacuum from building up in the bottle as the fluid is dispensed. In a first example, the diameter of the valve 20 is an eighth inch, and automatically opens at a pressure of −0.1 inches water column to −0.2 inches water column (vacuum in bottle). These valves 20, 22 allow for smooth flow through the liquid inlet/outlet for both the filling and dispensing operations of the bottle.

Figure 3:
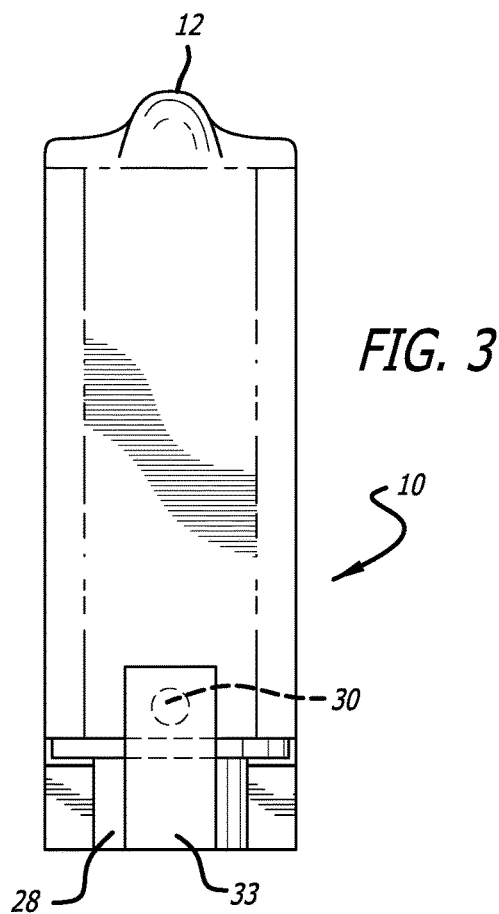
FIG. 3 is a side view of the embodiment of FIG. 1.

The inlet check valve 20 and outlet check valve 22 may be spring actuated check valves such as the Series 100 relief valves offered by Smart Products, Inc. of Morgan Hill, Calif. Alternately, the check valves 20, 22 may be diaphragm-type check valves such as those offered by Ark-Plas Products, Inc. of Flippin, Ak. In yet another embodiment, the valves can be magnetically controlled such as the smart check valves offered by Magic Plastics, Inc. of Valencia, Calif., where a magnetic field stores energy that can be used to control the valve. FIG. 3 illustrates the bottle 10 in profile, showing the dispensing button 30 used to actuate the delivery of the product and the cup 28 that can receive the product being dispensed from a valve 16 as described below.

Figure 4:
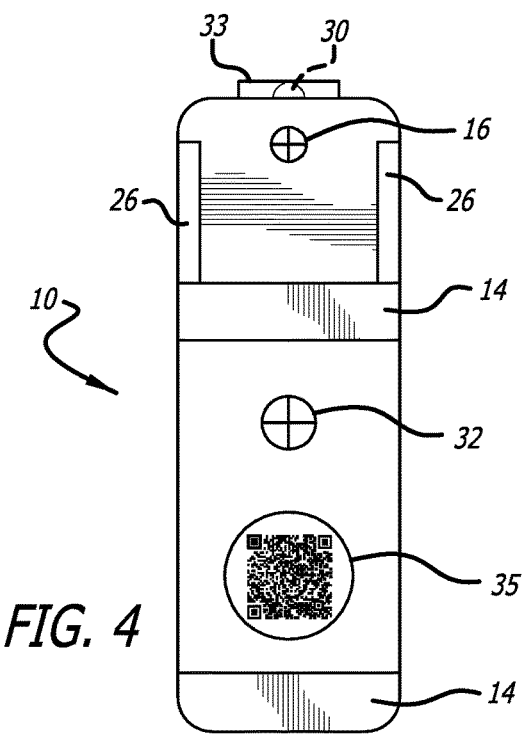
FIG. 4 is a bottom view of the embodiment of FIG. 1.

FIG. 4 illustrates the underside of the bottle where a two additional ports are located. A dispensing valve 16 is positioned below a ledge 26 in the bottle where product can be dispensed into a cup 28 or other container. The dispensing valve 16 may be actuated by a dispensing button 30 on the front/side of the bottle 10 to transfer product from the bottle to the cup 28, and have a diameter of three fourths of an inch. The dispensing valve 16 is preferably mechanically controlled by depressing the button 30, although other means for opening and closing the dispensing valve 16 is available as well. Centrally located on the bottom of the bottle 10 is a filling port and valve 32. The filling port and valve 32 is used by the refill station to transfer product to the bottle 10. This can be done with a probe on the refill station that, once the bottle is positioned in the refill station transfer holder, is inserted into the filling port and valve 32 to fill the bottle. As product is transferred into the bottle 10, the air outlet port 22 expels the resident air in the bottle to prevent over-pressurization of the bottle. In a first example, the diameter of the filling port and valve 32 is a half inch and opens at a pressure of 4-8 PSIG.

An important aspect of the present invention is that the valves 20, 22, 32 operate automatically without human intervention. That is, the valves are triggered by pressure differences and can actuate when needed to equalize the pressure within the bottle 10. Furthermore, there are no caps, covers, or lids for the customer to open, close, tighten, remove, or replace in order to use the product. The customer merely has to depress the dispensing button 30 to deliver the product to a cup or directly into a washing machine if desired.

While the inventor's preferred embodiments have been described and depicted herein, the invention is not limited to the preferred embodiment. A person of ordinary skill in the art would readily recognize various substitutions and modifications to the aforementioned preferred embodiments, and the invention is intended to include all such substitutions and modifications. Accordingly, the scope of the invention is not limited by any depiction or description herein unless expressly limited, but rather the scope is governed by the words of the appended claims, using the plain and ordinary meaning of the words therein consistent with, but not constrained by, the foregoing description.

We claim:

1. A reusable, refillable bottle for dispensing a viscous fluid acquired from a refill station, the bottle comprising:
   a body supported by a plurality of legs and including a handle on an upper surface;
   a first one way valve on the upper surface for automatically introducing air into the body of the bottle when a pressure in the bottle falls below a predetermined value;

a second one way valve for releasing air from the interior of the body as product is introduced into the body;

a dispensing button adjacent to a lower surface of the bottle;

a dispensing valve on a bottom surface of the bottle; and a fill valve on the bottom surface of the bottle for filling the bottle with product;

wherein the bottle lacks a lid or removable top.

2. The bottle of claim 1, wherein the capacity of the bottle is between sixty four fluid ounces and one hundred twenty eight fluid ounces, inclusive.

3. The bottle of claim 1, wherein the second one way valve automatically opens at a pressure of 2-4 PSIG, inclusive.

4. The bottle of claim 1, wherein the first one way valve automatically opens at a pressure of −0.1 inches water column to −0.2 inches water column, inclusive.

5. The bottle of claim 1, wherein the first and second one way valves are spring actuated check valves.

6. The bottle of claim 1, wherein the first and second one way valves are diaphragm check valves.

7. The bottle of claim 1, wherein the first and second one way valves are magnetic check valves.

8. The bottle of claim 1, wherein the dispensing button mechanically actuates the dispensing valve.

9. The bottle of claim 1, wherein a tamper-indicating decal is placed over the dispensing button to evidence a first use.

10. The bottle of claim 9, wherein the tamper-indicating decal includes a bar code.

11. The bottle of claim 1, further comprising an RFID tag.

12. The bottle of claim 11, wherein the RFID tag can communicate with a remote refill station to assist in recall operations.

* * * * *